United States Patent Office 2,701,242
Patented Feb. 1, 1955

2,701,242

LOW TEMPERATURE POLYMERIZATION PROCESS AND COMPOSITION

Michael Erchak, Jr., Morris Township, Morris County, Karl F. Koch, Madison, and Harry Knutson, Morristown, N. J., assignors to Allied Chemical & Dye Corporation, New York, N. Y., a corporation of New York No Drawing. Application May 22, 1952,
Serial No. 289,422

9 Claims. (Cl. 260—63)

This invention relates to catalyzed addition polymerization of monomers defined below and to polymerizable compositions comprising said monomers and the catalyst of our invention.

In particular this invention relates to use of a catalyst which initiates and maintains at high reaction rates polymerizations, including copolymerizations, of acrylo monomers, at temperatures in the range between about 0° and about 35° C.; and relates to compositions comprising said monomers and said catalyst.

Initiation of polymerization in the temperature range 0°–35° C., followed by rapid polymerization in this temperature range, is of importance in applications of polymerizable compositions such as gluing, laminating, casting, coating, and modifying the character of earth, e. g. hardening soft ground. Use of these temperatures is also of interest for production of high polymers for synthetic rubbers, synthetic filaments, molding compositions, self-supporting films, etc. since polymerization carried out at these relatively low temperatures tends to form polymers having especially good properties for the above and related uses.

In accordance with our invention, compositions polymerizable at temperatures maintained within the range between about 0° and about 35° C. comprise (1) at least one acrylo monomer, i. e. a monomer in which the group $H_2C=C$ (the vinylidene group) is attached directly to at least one carbon atom which is in turn attached by a multiple linkage to a nitrogen or an oxygen atom, the remaining valence of the vinylidene group being satisfied by a hydrogen, carbon or halogen atom; with substantially all of the polymerizable ingredient being monoene monomer and with said acrylo monomer amounting to 50–100 mol percent of the polymerizable ingredient; (2) potassium permanganate; (3) oxalic acid. Additionally, especially in copolymer systems it is sometimes advantageous to have present water and an emulsifying agent active in water under acid conditions.

By "mono-ene" monomer above specified, we mean a compound having one and only one point of carbon-to-carbon aliphatic unsaturation in the molecule, said unsaturation being a double bond.

Illustrative of the acrylo monomers which can be homopolymerized by our process and copolymerized with each other in all proportions to high molecular weight polymers are acrylonitrile, methyl acrylate, methyl methacrylate, methyl vinyl ketone and like nitriles, esters, ketones, etc. Acrylonitrile is especially active in our process.

Other types of unsaturated monomers such as specifically styrene, vinyl chloride, vinylidene chloride and vinyl acetate, which are ordinarily considered polymerizable similarly to the acrylo monomers above cited, do not homopolymerize or copolymerize with each other to any substantial extent in reasonable times such as 24 hours under our conditions of catalyst and temperature. These other unsaturated monomers do, however, rapidly copolymerize to high yields of high molecular weight polymers with acrylo monomer under our catalyst and temperature conditions in reaction mixtures in which at least one acrylo monomer forms at least 50 mol percent of the polymerizable ingredient.

Copolymers are also formed under our catalyst and temperature conditions between acrylo monomer amounting to at least 50 mol percent of the polymerizable ingredient and an unsaturated monomer of type which does not ordinarily homopolymerize to high molecular weight polymers at least at temperatures in the 0°–35° C. range, such as diethyl maleate, diethyl fumarate, trichloroethylene, vinyl ethyl ether, alpha-methylstyrene and isobutylene.

Systems containing substantial proportions of diene monomer, such as 1,3-butadiene and cyclopentadiene under our catalyst and temperature conditions at best polymerize and copolymerize only slowly giving only low yields in reasonable times under the conditions of our invention.

The following examples are illustrative of our invention, but the invention is not to be understood as limited to the details of these examples. References to parts hereinafter are parts by weight.

Typically the compositions employed in the examples were polymerized by the following method:

A three necked, round-bottom flask, fitted with a water sealed stirrer, a reflux condenser, a gas inlet tube and thermometer was flushed out with distilled water, and a stream of nitrogen was passed through the system so as to displace all the air and was passed over the reaction mixture during the entire reaction. Monomer was purified by fractionation in an atmosphere of inert gas such as nitrogen or carbon dioxide. A weighed amount of distilled water, containing the oxalic acid, emulsifier, if any, and monomer(s) was then charged into the flask and stirred. After the mixture became homogeneous, the potassium permanganate in solution in distilled water was introduced at a predetermined rate by means of a small pipette. The temperature was then adjusted with a suitable bath and held within the limits of the experiment.

At the end of the polymerization, the reaction mixture was filtered or (if emulsifying agent was present) was poured, with stirring, into an equal volume of methanol, in order to coagulate the dispersed polymer which had formed. The polymer filtered off was washed several times with distilled water and twice with methanol, and then was dried in a circulating oven at 60° C. to contant weight. The yield reported is that of washed dried polymer.

*Example 1 (a).*—A composition consisting of 100 parts of acrylonitrile, 800 parts of water, and one part of oxalic acid dihydrate of formula $H_2C_2O_4.2H_2O$ was made up, and 1 part of potassium permanganate dissolved in 200 parts of distilled water was added rapidly with stirring at room temperature under nitrogen in accordance with the above outlined procedure. Polymerization was complete in 30 minutes and gave 100% yield of solid polymer.

1 (b).—When the above described experiment was carried out employing a composition containing 0.5 part of potassium permanganate instead of one part, essentially the same results as those described under (a) above were obtained.

*Example 2.*—A composition consisting of 10 parts of methyl acrylate, 300 parts of distilled water, 3 parts of Igepon-T (a sulfonated long chain organic acid amide type emulsifying agent), one part of oxalic acid dihydrate and 0.5 part of potassium permanganate was made up and polymerized as in Example 1. The composition was 100% polymerized within one hour to a solid polymer.

*Example 3 (a).*—A composition consisting of 500 parts of methyl methacrylate, 4000 parts of distilled water, 10 parts of Igepon-T emulsifying agent, 5 parts of oxalic acid dihydrate and 1.25 parts of potassium permanganate in 1000 parts of distilled water was made up and polymerized as described in Example 1 at 25° C. A 90% yield of solid poly methyl methacrylate was obtained in 4 hours.

*Example 3 (b).*—A composition as in part (a) of this example, except containing methyl vinyl ketone instead of methyl methacrylate as the polymerizable ingredient, was made up and polymerized at 25° C. as described in part (a), except coagulation of polymer was effected with aluminum sulfate. An 80% yield of solid poly methyl vinyl ketone was obtained in 2 hours. This polymer formed clear rubbery films from acetone solvent.

*Example 4 (a).*—A composition was made up and polymerized as described in Example 3 employing 350 parts of acrylonitrile and 150 parts of methyl vinyl ketone as the polymerizable ingredient. Polymer was observed after an induction period lasting about 5 minutes. A 94% yield of solid copolymer was obtained in 4 hours. Intrinsic viscosity of this copolymer measured in dimethyl formamide solution at 40° C. and 0.125% by weight of solids was 2.37.

4 (b).—A composition was made up and polymerized at 22° C. as described under part (a) of this example except that 400 parts of acrylonitrile and 100 parts of methyl methacrylate were employed instead of acrylonitrile-methyl vinyl ketone. Polymerization began after an induction period of about 2 minutes and gave an 89% yield of solid copolymer in 2 hours.

*Example 5.*—A composition was made up and polymerized at 22°–25° C. as described in part (b) of the foregoing example, except that styrene was employed instead of methyl methacrylate. Polymerization began after an induction period of about 4 minutes. A 70% yield of solid copolymer was obtained in 2 hours. The copolymer contained 61.5% by weight of acrylonitrile and had intrinsic viscosity of 2.52, measured in dimethyl formamide solvent at 40° C. and 0.125% by weight of solids. This copolymer could be wet spun from dimethyl formamide solution into a water bath and fabricated into a yarn of good properties by drying and stretching at elevated temperatures.

*Example 6.*—A composition was made up and polymerized as in Example 4 (b) at 0° C. Polymerization began after an induction period of about 35 minutes. A 78% yield of solid copolymer was obtained in 4 hours. Intrinsic viscosity of a solution of this copolymer in dimethyl formamide, at 40° C. and at 0.125% by weight of solids, was 3.58.

Spinning solutions of the copolymer of this example were made up in dimethyl formamide and were found to have good handling properties. Yarns wet spun from these solutions into a water bath and subjected to drying, and to molecular orientation by stretching at elevated temperatures, developed ultimate tensile strength of 5.4 grams per denier with elongation of 7% at the breaking point.

*Example 7.*—100 parts of freshly distilled acrylonitrile, 800 parts of distilled water, 1 part of oxalic acid dihydrate and 0.5 part of manganese sulfate were charged into a reaction vessel immersed in ice, so as to keep the reaction temperature at 0° C. 0.25 part of potassium permanganate dissolved in 200 parts of distilled water was then added and the mixture stirred for 4 hours. The yield of 80 parts represents 80% of the weight of the monomer employed. A sample of this polymer had an intrinsic viscosity of 4.53. Fibers of good properties, similar to those of commercial acrylonitrile-based fibers, were prepared by wet spinning from dimethyl formamide solution into a water bath.

*Example 8.*—350 parts of freshly distilled acrylonitrile, 150 parts of isobutylene, 4000 parts distilled water, 10 parts of Renex (a non-ionic, polyoxyethylene ester type emulsifying agent), 20 parts of oxalic acid and 160 parts of methanol were charged into a glass reaction vessel kept at —4° C. After adjusting the pH to 1 with sulfuric acid, a solution of 1.25 parts of potassium permanganate in 1000 parts of distilled water was added. The reaction mixture was then held at 0° C., with constant stirring for ten hours and then allowed to warm up to room temperature. A 78% yield of washed, dried solid copolymer was obtained, insoluble in dimethylformamide and containing 76.5% acrylonitrile.

One or more of the following factors will generally tend to vary the reaction rate and/or length of induction period in a reaction system in accordance with our invention:

(1) Varying the ratio of potassium permanganate and/or oxalic acid to monomers. Ordinarily potassium permanganate is introduced in amounts between about 0.05 and about 0.5 part by weight per 100 parts by weight of oxalic acid ordinarily is introduced in amounts between about 0.1 and about 1 part by weight per 100 parts by weight of monomers. Preferably the weight ratio of $KMnO_4:H_2C_2O_4.2H_2O$ is in the range between about 1:2 and about 1:4.

(2) When more than one monomer is employed, varying their ratio. If one monomer is an acrylo monomer and the other is not, increasing the proportion of acrylo monomer will usually result in faster reaction at given temperature.

(3) Presence of elemental oxygen such as oxygen of air in contact with the reaction mixture may lengthen the induction period.

(4) Allowing the reaction mixture to remain quiescent, agitating only toward the end of the reaction period and only enough to maintain the monomers in dispersed form sometimes results in faster overall reaction than obtained with continuous stirring.

(5) Employing higher temperatures generally increases rates and shortens induction period. However, certain systems, specifically acrylonitrile-isobutylene, gave higher yields in given time at relatively low temperatures such as 0° C. than at room temperature.

(6) Employing water in the reaction medium, e. g. between about a 3:1 weight ratio of water:monomer and about a 15:1 weight ratio of water:monomer sometimes results in faster overall reaction.

(7) Employing aqueous medium and an emulsifying agent active in acidic aqueous media sometimes results in faster overall reaction. Suitable emulsifying agents are anionic organic agents such as alkyl aryl sulfonate and higher alkyl sulfates, alkane sulfonates, and sulfonated long chain acid amide emulsifying agent; non-ionic organic agents such as polyoxyethylene esters, etc. i. e. reaction products of several molecules of ethylene oxide with long chain amines, alcohols or acids; and inorganic emulsifying agents such as sodium bisulfite, potassium bisulfite, and calcium bisulfite.

(8) Employing aqueous medium and dissolving therein a salt in which manganese is the cation, such as manganous sulfate, shortens induction period and accelerates emulsion polymerization of e. g. acrylonitrile.

(9) Reaction mixtures in accordance with our invention contain oxalic acid and accordingly have acid pH. A pH in the range between about 2 and about 7 usually gives fastest reaction. Control of pH thus offers a means of controlling the reaction rate.

(10) Construction material of the reaction zone may exert inhibitory influence in some cases.

The possibility of adjusting the induction period and/or rate of reaction as above outlined is an advantage of our compositions and process since there can thus be established a time interval for working the composition before it has begun to polymerize or "set."

The presence of 2 catalyst components in our compositions likewise facilitates working since the two components can be introduced separately to form in situ at the point of application a composition in accordance with our invention. Thus for example either catalyst component, dissolved or otherwise dispersed in a medium which can contain or consist of part or all of the monomers, can be applied to a surface to be coated; and then the other catalyst component dispersed in the same or a different medium can be applied to the surface; and polymerization can be made to start almost immediately or after an induction period in the range between, for example, one and sixty minutes depending on factors including those above outlined.

Additional ingredients besides monomers, catalyst, water if desired, emulsifying agent if desired, etc. can be employed in our compositions, such as thickeners, tackifiers, fillers, pigments and the like and can be present in either or both of the above mentioned dispersions or solutions of catalyst components and monomers.

The polymerization reactions above outlined are exothermic. Accordingly such polymerizations initiated in the temperature range 0°–35° C. will develop higher temperatures during the course of the polymerization, unless the cooling capacity of the system is adequate to remove heat at substantially the rate at which it is generated. In some cases, at least a moderate temperature rise will not be objectionable.

If close control of temperature is desired, temperatures can be controlled during polymerizations in accordance with our process by conducting the polymerization in presence of a diluent such as water or a solvent for the monomers and by adding gradually at least one of the catalyst components with or without further monomer, e. g. gradually adding the oxalic acid catalyst component in dilute aqueous solution to a reaction mixture containing the monomer ingredient and potassium permanganate. Oxidation potential of the reaction mixture can be employed as criterion for regulating rates of addition of fresh catalyst.

Another method of using my catalysts and compositions is as initiators of polymerization which is maintained by a less active catalyst, after temperatures have risen spontaneously to a point when the less active catalyst is effective. Thus a monomer-catalyst composition inactive at room temperature can be applied to a surface, and my catalyst can be incorporated locally or throughout in amounts initiating polymerization at room temperatures, and maintaining it until spontaneous temperature rise is sufficient to activate the supplementary catalyst which completes the reaction at a suitable rate.

We claim:
1. A composition polymerizable at temperatures maintained within the range between about 0° C. and about 35° C. which comprises (1) a polymerizable monomer ingredient of which 50–100 mol percent is at least one material of the group consisting of acrylonitrile, methyl acrylate, methyl methacrylate and methyl vinyl ketone, with substantially all of the polymerizable ingredient being mono-ene monomer; and (2) a catalyst consisting essentially of potassium permanganate and oxalic acid.

2. Composition as defined in claim 1, wherein at least 50 mol percent of the polymerizable ingredient is acrylonitrile.

3. Composition as defined in claim 2 wherein water is present in at least 3:1 weight ratio of water:monomers.

4. Composition as defined in claim 3 wherein at least one other mono-ene monomer is present in addition to acrylonitrile and wherein an emulsifying agent active in acidic aqueous solutions is present.

5. In a process for polymerizing polymerizable mono-ene monomer the improvement which comprises admixing mono-ene monomer of which 50–100 mol percent is at least one material of the group consisting of acrylonitrile, methyl acrylate, methyl methacrylate and methyl vinyl ketone, with a catalyst consisting essentially of potassium permanganate and oxalic acid at temperatures in the range between about 0° C. and about 35° C. substantially all of the polymerizable monomer being mono-ene monomer.

6. In a process as defined in claim 5, the further improvement which comprises dispersing said mono-ene monomer in a reaction medium in which potassium permanganate and oxalic acid are soluble.

7. Process for polymerizing a polymerizable mono-ene monomer of which 50–100 mol percent is at least one material of the group consisting of acrylonitrile, methyl acrylate, methyl methacrylate and methyl vinyl ketone, which comprises dispersing said mono-ene monomer in water and introducing a catalyst consisting essentially of potassium permanganate and oxalic acid into said dispersion, said dispersion being at least initially at temperatures in the range between about 0° C. and about 35° C. substantially all of the polymerizable monomer being mono-ene monomer.

8. Process as defined in claim 7 wherein at least 50 mol percent of the polymerizable ingredient is acrylonitrile.

9. Process as defined in claim 8 wherein at least one other mono-ene monomer is present in addition to acrylonitrile and wherein polymerization is in aqueous emulsion system at temperatures maintained throughout the polymerization period in the range between about 0° C. and about 35° C.

References Cited in the file of this patent
UNITED STATES PATENTS

| | | |
|---|---|---|
| 2,388,373 | Stewart | Nov. 6, 1945 |
| 2,594,560 | Howard | Apr. 29, 1952 |
| 2,595,892 | Schulze et al. | May 6, 1952 |